United States Patent [19]

Depcik

[11] Patent Number: 5,061,415
[45] Date of Patent: Oct. 29, 1991

[54] PROCESS FOR IMPROVING THE QUALITY OF INJECTION MOULDED PARTS

[75] Inventor: Hans-Werner Depcik, Duesseldorf, Fed. Rep. of Germany

[73] Assignee: Bayer Aktiengesellschaft, Leverkusen, Fed. Rep. of Germany

[21] Appl. No.: 494,905

[22] Filed: Mar. 9, 1990

Related U.S. Application Data

[63] Continuation of Ser. No. 180,963, Apr. 13, 1988, abandoned.

[30] Foreign Application Priority Data

Apr. 25, 1987 [DE] Fed. Rep. of Germany ....... 3713931

[51] Int. Cl.$^5$ .............................................. H05B 6/46
[52] U.S. Cl. ..................................... 264/25; 264/259; 264/327; 264/328.7
[58] Field of Search ...................... 264/25, 327, 328.7, 264/328.14, 259; 425/127

[56] References Cited

U.S. PATENT DOCUMENTS

| | | | |
|---|---|---|---|
| 3,350,487 | 10/1967 | Hofer et al. | 264/327 |
| 4,439,492 | 3/1984 | Wada et al. | 264/25 |
| 4,489,018 | 12/1984 | Ball | 264/25 |
| 4,536,242 | 8/1985 | Gripenholt et al. | 264/25 |
| 4,548,773 | 10/1985 | Suh et al. | 264/327 |
| 4,562,026 | 12/1985 | Mosher | 264/259 |
| 4,707,310 | 11/1987 | Debeaud | 264/328.14 |

FOREIGN PATENT DOCUMENTS 55-097941  7/1980  Japan ................................ 264/328.7

OTHER PUBLICATIONS

"Ullmann's Encyclopedia of Industrial Chemistry", vol. B3, pp. 15-5 to 15-8.

*Primary Examiner*—Robert A. Dawson
*Assistant Examiner*—Allan R. Kuhns
*Attorney, Agent, or Firm*—Connolly and Hutz

[57] ABSTRACT

Sunk spots in critical regions of a plastics injection moulded part are prevented by localized heating of the marginal zone of the part in the course of the production cycle by means of a high frequency electromagnetic field and application of a pressure in this region.

8 Claims, No Drawings

PROCESS FOR IMPROVING THE QUALITY OF INJECTION MOULDED PARTS

This application is a continuation of application Ser. No. 180,963 filed Apr. 13, 1988 now abandoned.

This invention relates to a process for improving the quality of injection moulded parts which are difficult to produce on account of their shape, by subjecting the substance to a high frequency electromagnetic field in the course of the production cycle by means of electrodes arranged in the mould while the substance is still at least partly thermoplastic.

In moulded parts it is often necessary for constructional reasons to have certain regions which are very thin, which make it difficult to fill the mould completely, especially if, viewed in the direction of flow, the dimensions of the mould cavity increase after the narrow portion. This results in faulty areas in the product and in addition cooling is accompanied by shrinkages which may result in collapsed areas on the surface.

It has hitherto been attempted to overcome these problems by exerting after-pressure in the region near the point of injection while it is still partly plastic.

Owing to the small cross-section, however, this portion solidifies very rapidly when the material cools so that pressure can then no longer be exerted on the plastic core of the moulded part through the injection channel. The result is defects in the constructional region or on the surface of the plastics part, whereby the quality is seriously impaired.

A process is known in which the moulding compositions inside the closed mould are exposed to a high frequency field during the injection process for the purpose of lowering the viscosity in order to improve the flow, this field being produced by the mould halves which are designed to function as electrodes.

The disadvantage of this process is that although the fluidity of the composition is improved during the injection process, also with great expenditure of energy, the after-pressure required while the material cools down cannot be maintained for the requisite length of time because the polymer material solidifies too soon in the unheated feed channel and the after-pressure can then no longer be transmitted. Areas of collapse are therefore found in the finished moulded part.

It is an object of the present invention to find a process by which the thermoplastic polymer mass can be so distributed inside the closed mould during the requisite time, which depends on the temperature and the particular product, that no areas of collapse can form in the critical parts of the moulded product, especially the visible parts, in the course of cooling.

To solve this problem according to the invention, heat is directly supplied after injection to a particular, localized part of the polymer material by a high frequency electromagnetic field to plasticize it, and pressure is exerted on the thermoplastic mass in this heated area by a ram.

By the process according to the invention it is possible to reverse the change of form due to shrinkage during cooling of the material even after the thermoplastic compound has been injected, when the mould is closed and the point of injection is already cold. For this purpose, the polymer material which is already cold near the wall of the mould is directly heated by a high frequency field in the region of a ram and plasticized so that the ram can then exert pressure at this point on the material in the core which is still thermoplastic due to the temperature gradient, so that shrinkages can be corrected right to the last moment and the dimensional accuracy of the moulded parts can be substantially improved and areas of collapse can be prevented. Since the ram can be placed in any position which is not dependent on the position of the injection point, it is possible with this process for the first time to apply the necessary pressure to critical points even in large moulded parts, and even to points which are at the very end of the flow path, without any need to increase the locking pressure of the mould since the measures provided according to the invention can avoid the significant pressure losses which normally occur at points which are at a considerable distance from the injection point.

The ram, which may move automatically (e.g. by spring action) or by external force (e.g. hydraulic piston), may act either through a projection in the unseen part of the product or by penetrating the interior cavity of the moulded part and at the same time producing the necessary groove or other recess in the injection moulded part, a flawless surface being obtained on the visible part in either case. Excess material may be discharged through an overflow which may also be used to adjust the required pressure.

It would also be possible to use a ram which fulfils additional functions, for example it may serve as electrode which may subsequently function as the knock-out when the product is cold.

Furthermore, the head end of the ram could be fitted with a metal part which is left in the moulded product to serve as connecting member to other plastics parts.

In another embodiment of the process, flow paths in the form of channels of reduced viscosity in the material leading to the critical regions can be maintained by means of the electric field to increase the region of influence of the ram and above all to obviate the need for ribs for the purpose of transporting the material.

The part of the ram inside the mould is advantageously so designed that after it has been pushed in, its external contour conforms exactly to the required round or conical depression or straight or curved groove.

The synthetic resin parts are subjected in the region of the ram to an electromagnetic alternating field generally at a frequency of from $10^5$–$10^{10}$ Hz, preferably from $10^6$–$10^9$ Hz, with an electric field strength of from 0.5 to 20 kV/mm, in particular from 1 to 8 kV/mm.

For partially crystalline material, the operating temperature must be more than 10° C. above the melting point of the material and for amorphous material it must be more than 30° C. above the glass transition temperature. The electric loss factor should be 0.01 at this temperature. For injection times of from 0.5 to 10 and even up to 30 s, it is generally necessary to employ after-pressure times of 1.5 to 30 s, in particular from 2.5–15 s.

The moulding materials used may be any partially crystalline or amorphous thermoplastic polymers or any elastomers which can be processed thermoplastically. The process may in particular be used for the following materials or mixtures thereof (blends):

Aromatic polyesters; acrylonitrile/butadiene/styrene terpolymers; polyamides; polyethylenes; polybutylene terephthalate; polyethylene terephthalate; polycarbonate; polyphenylene sulphide; polystyrene; polyphenylene oxide; polymethylmethacrylate and styrene-acrylonitrile copolymers.

EXAMPLE

A moulded part of polycarbonate 50 mm in width and 45° mm in length with a wall thickness of 3.5 mm is injected from the narrow side with the temperature of the material at 310° C. and the temperature of the mould at 80° C. and a flow velocity of 35.8 cm$^3$/s. After a length of 330 mm, a reduction in wall thickness of 1.2 mm is obtained over the whole width for a length of 20 mm.

An accumulation of material measuring 5×20×30 mm is situated at a remote corner of the injection moulded part and requires prolonged after-pressure to prevent collapse and pitting. This after-pressure is normally ineffective due to premature solidification of the material in the area of reduced wall thickness. Moreover, the temperature of the material is reduced by 4° C. at this area of constriction and there is a pressure loss of 260 bar. Without the constriction, a pressure of 360 bar would be required. Due to the constriction, there is a further pressure loss of 145 bar which would require an increase in the temperature of the material by 64° C. to compensate for it.

In the present case, an overflow 12 mm in diameter and 10 mm in length is arranged immediately behind the portion of reduced wall thickness and a pressure piston 10 mm in diameter is arranged to act on this overflow. The mass, which readily flows into this area during the filling process, is heated by about 15° to 20° C. by a high frequency field with a frequency of 27 MHz and an electric field strength of 3150 V/cm, corresponding to a heating output of 10° C./sec x g, and after the mould has been completely filled this area is subjected to a pressure of 100 bar which is fully effective as after-pressure and prevents pitting and collapse even in fairly thick walls. The increase in temperature prevents premature solidification and may be sensitively adjusted by the intensity of the HF field. Moreover, the partial increase in temperature gives rise to "internal" flow channels.

I claim:

1. Process for improving the quality of plastics injection moulded parts which are difficult to produce on account of their shape by subjecting polymer material to a high frequency electromagnetic field from electrodes inside a mould during the production cycle while the material is still at least partly thermoplastic, wherein after injection, a localized area of the polymer material is directly heated by a high frequency electromagnetic field at a frequency of from $10^6$ to $10^{10}$ Hz and a pressure is applied to the polymer material in said localized area by a ram after the mould is closed.

2. Process for improving the quality of plastics injection moulded parts according to claim 1, wherein the ram exerts its pressure in the region of an overflow which may subsequently be removed.

3. Process for improving the quality of plastics injection moulded parts according to claim 1, wherein the ram penetrates the cavity of the mould when the pressure is applied.

4. Process for improving the quality of plastics injection moulded parts according to claim 1, wherein a metal lost insert head end of the ram is ultimately connected to the plastics part as the pressure is applied.

5. Process for improving the quality of plastics injection moulded parts according to claim 1, wherein individual flow paths to critical filling points are heated by an electromagnetic field.

6. Process for improving the quality of plastic injection moulded parts according to claim 1, wherein the localized area in the region of the ram is heated by an electromagnetic alternating field with an electric field strength of from 0.5 to 20 Kv/mm.

7. Process for improving the quality of plastics injection moulded parts according to claim 1 wherein pressure is applied to said localized area by the ram for a time of from 1.5 to 30 seconds.

8. Process for improving the quality of plastics injection moulded parts according to claim 1 wherein the operating temperature is at least 10° C. greater than the melting point of the material being moulded when the material is at least partially crystalline and at least 30° C. greater than the glass transition temperature when the material is amorphous.

* * * * *